(12) United States Patent
Kathman et al.

(10) Patent No.: US 6,788,423 B2
(45) Date of Patent: Sep. 7, 2004

(54) CONIC CONSTANT MEASUREMENT METHODS FOR REFRACTIVE MICROLENSES

(75) Inventors: Alan D. Kathman, Charlotte, NC (US); Thomas J. Suleski, Charlotte, NC (US); Alvaro Cruz-Cabrera, Charlotte, NC (US); Gregory Brady, Charlotte, NC (US)

(73) Assignee: Digital Optics Corp., Charlotte, NC (US)

( * ) Notice: Subject to any disclaimer, the term of this patent is extended or adjusted under 35 U.S.C. 154(b) by 2 days.

(21) Appl. No.: 10/138,522

(22) Filed: May 6, 2002

(65) Prior Publication Data

US 2003/0053077 A1 Mar. 20, 2003

Related U.S. Application Data

(60) Provisional application No. 60/316,000, filed on Aug. 31, 2001.

(51) Int. Cl.[7] ............................................. G01B 9/02
(52) U.S. Cl. ........................................................ 356/512
(58) Field of Search ................................ 356/512, 513, 356/515

(56) References Cited

U.S. PATENT DOCUMENTS

| 5,004,346 A | 4/1991 | Kuhel |
| 5,187,539 A | 2/1993 | Adachi et al. |
| 5,245,402 A | 9/1993 | Adachi |
| 5,286,338 A | 2/1994 | Feldblum et al. |
| 5,416,586 A | 5/1995 | Tronolone et al. |
| 5,583,630 A | 12/1996 | Kimura et al. |
| 5,625,454 A | 4/1997 | Huang et al. |

OTHER PUBLICATIONS

Greco V et al: "Interferometric Testing of Weak Aspheric Surfaces Versus Design Specifications" Optik, Wissenschaftliche Verlag GMBH. Stuttgart. DE. vol. 87, No. 4, (Jun. 6, 1999), pp. 159–162.

Juang J–D Al: "The Testing of a General Reotationally Symmetrical Aspherical Surface by using a Null Lens in a Zygo Interferometer" Measurement. Institute of Measurement Adn Control. London. GB. vol. 13, No. 2, (Apr. 1994), pp. 85–90, XP001069759 ISSN: 0263-2241 pp. 85–87; figures 1–3.

*Primary Examiner*—Samuel A. Turner
(74) *Attorney, Agent, or Firm*—Susan S. Morse

(57) ABSTRACT

An aspheric microlens, particularly a conic constant of the microlens, may be evaluated and this evaluation may be used to determine an optimal process for creating the aspheric microlens. Such evaluation may include a curve fitting or a numerical expression of the wavefront.

14 Claims, 2 Drawing Sheets

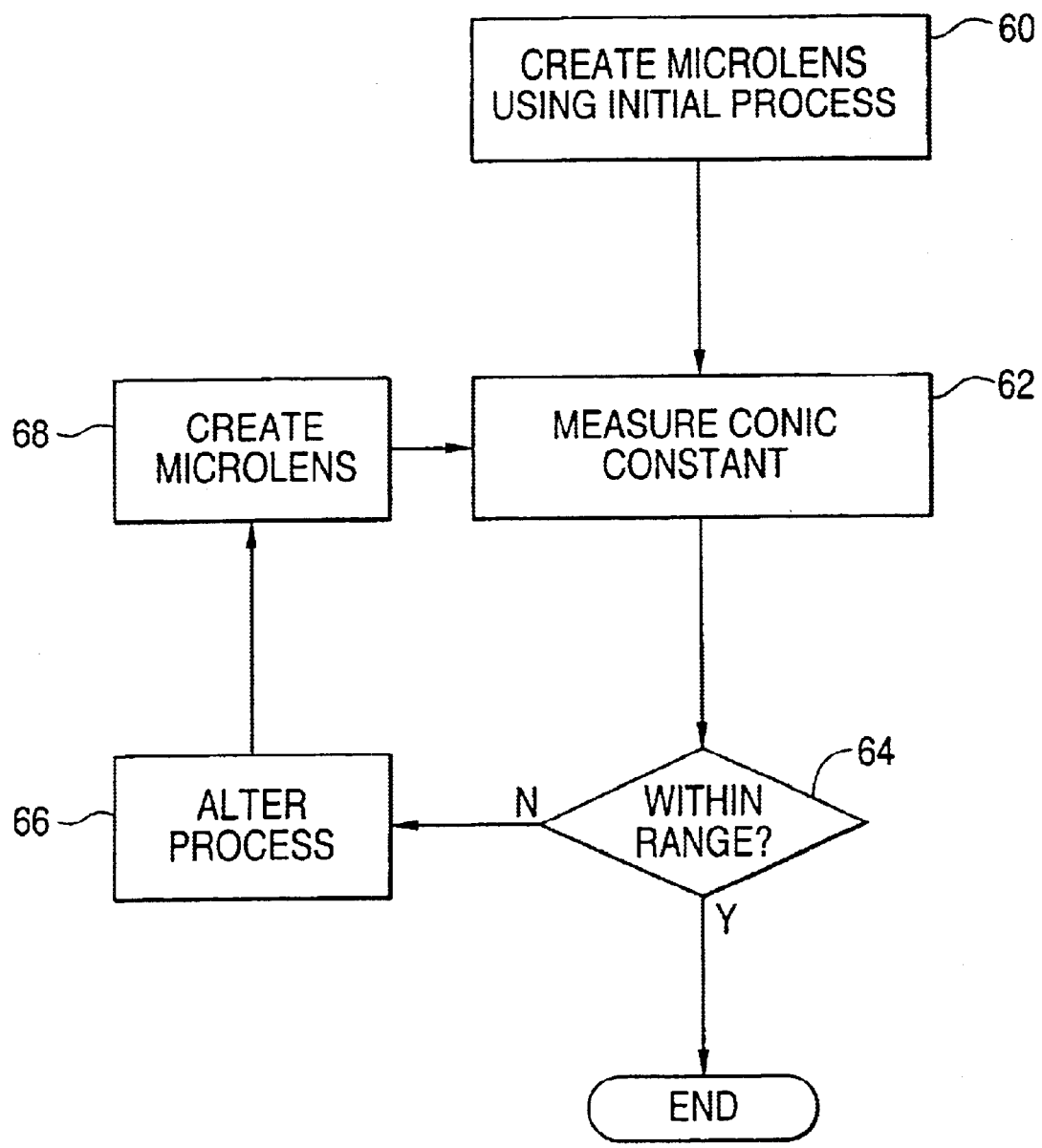

CONIC CONSTANT MEASUREMENT METHODS FOR REFRACTIVE MICROLENSES

CROSS-REFERENCES TO RELATED APPLICATIONS

The present application claims priority under 35 U.S.C. §119 to U.S. Provisional Patent Application No. 60/316,000 filed on Aug. 31, 2001, the entire contents of which are hereby incorporated by reference for all purposes.

BACKGROUND

1. Field of the Invention

The present invention is directed to a method for testing a conic aspheric microlens, more particularly for measuring a conic constant of the aspheric microlens, and even more particularly for determining an optimal process for making the aspheric microlens.

2. Description of Related Art

Measurement of the surface shape of a conic microlens can be made using an interferometer, such as a Twyman-Green interferometer 10 shown in FIG. 1. The interferometer 10 is capable of measuring the shape of a wavefront very precisely. A light source 12 provides coherent light to the interferometer 10. The interferometer 10 includes a beam splitter 14, a mirror 16, a driver 18, here shown as a piezoelectric element, an objective lens 20, a detector 22, here shown as a charge coupled device (CCD) camera, and a processor 24, here shown as a personal computer (PC).

Light from the light source 12 is divided by the beam splitter 14. Some of the light is directed onto the mirror 16 and reflected back to the beam splitter 18. The rest of the light is directed to an objective lens 20 to be focused onto an object under test, which reflects the light back to the beam splitter 14. The light from the mirror 16 and the object under test interfere at the beam splitter 14, which directs the interference pattern to the detector 22. The detector 22 outputs a signal representative of the interference pattern to the processor 24. The processor 24 then analyzes the data and determines desired parameters of the test object. The mirror 16 is on a translatable stage and its position is controlled by the processor 24 via the driver 18. The object under test may also be translated.

When a microlens 30 is placed in the interferometer 10 as the object under test, the reflected wavefront from the microlens surface can be measured. This measurement is typically performed using a spherical converging wavefront, produced using the objective lens 20. This is useful for measuring spherical lenses because the final measured wavefront is essentially a map of the deviation from sphere of the lens. The goal in this case would be to fabricate the lens to eliminate this deviation. An example of a commercial instrument that performs such a measurement is the Micro-Lupi metrology system produced by Zygo Corporation. However, the current metrology systems are not capable of measuring the shape of an aspherical lens.

SUMMARY OF THE PRESENT INVENTION

The present invention is therefore directed to a method of measuring aspheric refractive microlenses which substantially overcomes one or more of the problems due to the limitations and disadvantages of the related art.

It is an object of the present invention to provide a way to accurately measure the base sphere (or vertex) radius of curvature of a conic aspheric refractive microlens surface.

It is a further object of the present invention to provide a way to determine the conic constant of such an aspheric microlens surface.

It is yet a further object of the present invention to use the conic constant measurement to optimize the process of making aspheric microlenses.

At least one of the above and other objects may be realized by providing a method of evaluating an aspherical microlens including aligning the aspherical microlens in an interferometer, projecting a spherical wavefront on the aspherical microlens, detecting a wavefront reflected from the aspherical microlens, and deriving from the wavefront a conic constant that specifies the asphericity of the aspherical microlens.

The conic constant from the wavefront may be compared to a desired conic constant. The deriving may include fitting an equation representing an aspheric lens to the wavefront. The equation may be given by $$z(r) = \frac{R_c r^2}{1 + \sqrt{1 - (1+k)R_c^2 r^2}}$$

where $R_c$ is the base sphere radius of curvature, r is the radial coordinate, $z(r)$ is the surface height at r, and k is the conic constant. The deriving further may include determining the radial coordinate r by calibrating a lateral dimension of the wavefront. The deriving may include expressing the wavefront numerically as a set of polynomials. The set of polynomials constitutes Zernike polynomials. The conic constant derived from Zernike polynomials may be directly proportional to the cube of the base sphere radius of curvature and is inversely proportional to the fourth power of the diameter of the analysis aperture.

The method may further include determining the diameter of the analysis aperture by calibrating a lateral dimension of the wavefront. The method may include establishing a correct confocal position for the aspherical microlens. The method may include calibrating a lateral dimension of the wavefront. The calibrating includes providing controlled radial structures to thereby map positions in the wavefront to lateral coordinates on an object under test. The method may include altering manufacturing of the aspherical microlens in accordance with a difference between the conic constant and the desired conic constant. The method may include reiterating the altering until the conic constant is within a satisfactory range of the desired conic constant.

While the present invention is described herein with reference to illustrative embodiments for particular applications, it should be understood that the present invention is not limited thereto. Those having ordinary skill in the art and access to the teachings provided herein will recognize additional modifications, applications, and embodiments within the scope thereof and additional fields in which the invention would be of significant utility without undue experimentation. Thus, the scope of the invention should be determined by the appended claims and their legal equivalents, rather than by the examples given.

BRIEF DESCRIPTION OF THE DRAWINGS

The foregoing and other objects, aspects and advantages will be described with reference to the drawings, in which:

FIG. 3 is a flow chart of an application of the conic constant measurement of the present invention.

DETAILED DESCRIPTION

Figure 1:
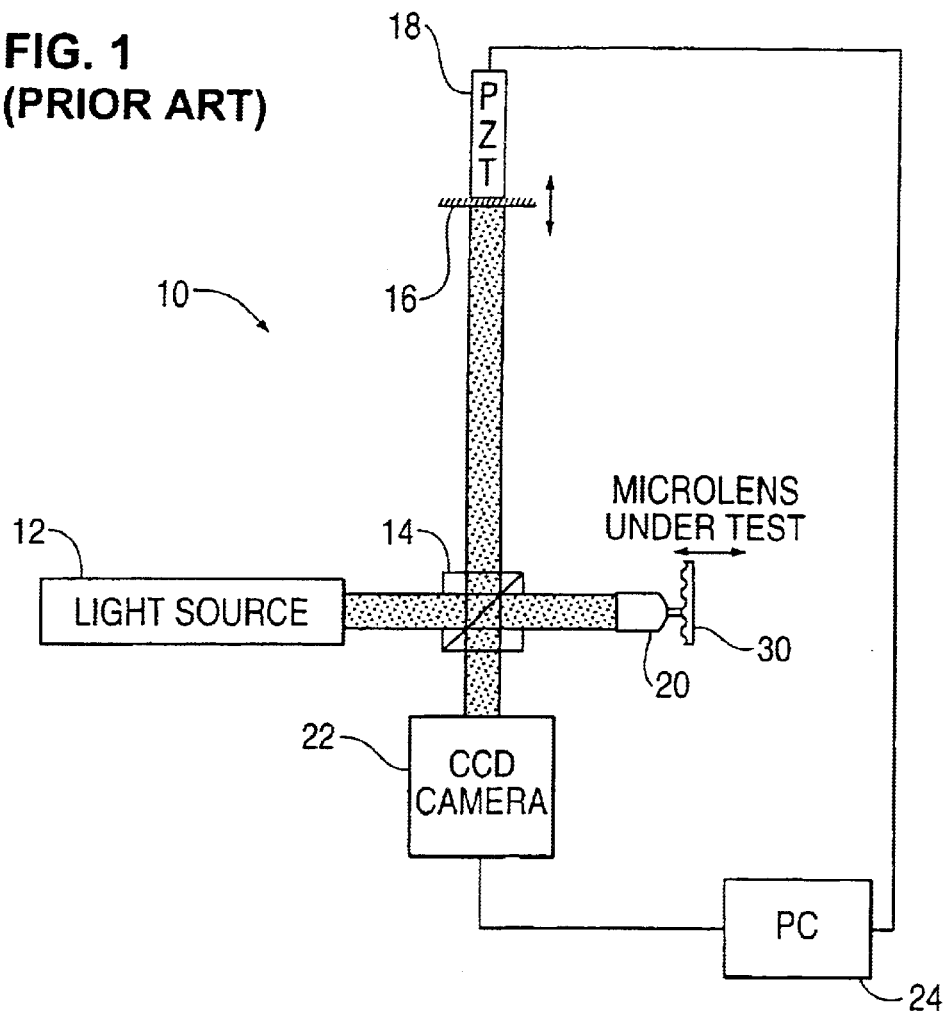
FIG. 1 is a schematic illustration of an interferometer for measuring microlenses.

The present invention will be described in detail through preferred embodiments with reference to accompanying drawings. However, the present invention is not limited to the following embodiments but may be implemented in various manners. The preferred embodiments are only provided to make the disclosure of the invention complete and make one having an ordinary skill in the art know the scope of the invention. Throughout the drawings, the same reference numerals denote the same elements.

As with spherical microlenses, aspheric refractive microlenses must be adequately tested in order to confirm that they satisfy design specifications. Parameters of interest may include the focal length and radius of curvature of the lens and the diameter of the lens aperture. However, because these aspheric refractive microlenses are designed to deviate from a sphere, a measurement specifying that deviation is needed. Most aspheric lenses take the form of a surface of rotation of a conic section, and can be specified by the relationship $$z(r) = \frac{R_c r^2}{1 + \sqrt{1 - (1+k)R_c^2 r^2}} \quad (1)$$

where $R_c$ the base sphere radius of curvature, r is the radial coordinate and z(r) is the surface height at r. The parameter k is known as the conic constant and is the parameter that specifies the asphericity of a conic lens.

One solution for translating wavefront information into the conic constant involves directly fitting curves to the measured wavefront. As noted above, the measured wavefront from an interferometer can be thought of as a measurement of the deviation of the lens shape from a sphere. However, if the radius of curvature of the microlens being measured is known, then the spherical component can be added to the deviation from the spherical data in order to arrive at a measurement of the surface shape of the microlens.

Then Equation (1) can be fit to this data using a numerical fitting algorithm to arrive at a value for the conic constant. Any conventional numerical fitting algorithm, e.g., least squares, N-variable grid search, et al., may be employed. Some assumptions are needed to make this fitting practical. First, it is assumed that the microlens 30 under test and the objective lens 20 are properly aligned to each other. Second, the radius of curvature is assumed to be the same for the wavefront and the microlens. These assumptions eliminate all but the conic constant and the radial coordinate r from the fit.

A calibration may then be performed to determine the radial coordinate r. This measurement cannot inherently be performed with the interferometer. However, the lateral dimension of the wavefront can be calibrated and used to determine a reasonable value for the radial coordinate. The calibration is required when setting up the system for testing a new microlens or when system alignment is adjusted. The lateral calibrations may be performed using artifacts with controlled radial features. Such artifacts may include ball bearings with several radial symmetric scratches, actual fused silica lenses with radial symmetric scratches, or truncated fused silica lenses, all having radial coordinates that are well controlled. In all of these calibrations, features having concentric ring patterns with a constant radial dimension are used to map the height on the object to a corresponding height in the resultant image.

This first method of curve fitting is simple in concept. However, it is slow and currently requires assumptions to reduce the number of variables to make the fit practical.

A second method involves expressing the wavefront numerically. Most commercially available interferometry software packages include a feature allowing a polynomial to be fit to the measured wavefront. The polynomial typically used is an additive combination elements of a set of polynomials called Zernike polynomials. The Zernike polynomial up to the $36^{th}$ coefficient is shown in Equation (2):

$$W = Z_0 + Z_1(\rho\cos\theta) + Z_2(\rho\sin\theta) + Z_3(2\rho^2 - 1) + \quad (2)$$
$$Z_4(\rho^2\cos2\theta) + Z_5(\rho^2\sin2\theta) + Z_6(3\rho^2 - 2)\rho\cos\theta +$$
$$Z_7(3\rho^2 - 2)\rho\sin\theta + Z_8(6\rho^4 - 6\rho^2 + 1) + Z_9(\rho^3\cos3\theta) +$$
$$Z_{10}(\rho^3\sin3\theta) + Z_{11}(4\rho^2 - 3)\rho^2\cos2\theta + Z_{12}(4\rho^2 - 3)\rho^2\sin2\theta +$$
$$Z_{13}(10\rho^4 - 12\rho^2 + 3)\rho\cos\theta + Z_{14}(10\rho^4 - 12\rho^2 + 3)\rho\sin\theta +$$
$$Z_{15}(20\rho^6 - 30\rho^4 + 12\rho^2 - 1) + Z_{16}(\rho^4\cos4\theta) +$$
$$Z_{17}(\rho^4\sin4\theta) + Z_{18}(5\rho^2 - 4)\rho^3\cos3\theta + Z_{19}(5\rho^2 - 4)\rho^3\sin3\theta +$$
$$Z_{20}(15\rho^4 - 20\rho^2 + 6)\rho^2\cos2\theta + Z_{21}(15\rho^4 - 20\rho^2 + 6)\rho^2\sin2\theta +$$
$$Z_{22}(35\rho^6 - 60\rho^4 + 30\rho^2 - 4)\rho\cos\theta +$$
$$Z_{23}(35\rho^6 - 60\rho^4 + 30\rho^2 - 4)\rho\sin\theta +$$
$$Z_{24}(70\rho^8 - 140\rho^6 + 90\rho^4 - 20\rho^2 + 1) + Z_{25}(\rho^5\cos5\theta) +$$
$$Z_{26}(\rho^5\cos5\theta) + Z_{27}(6\rho^2 - 5)\rho^4\cos4\theta + Z_{28}(6\rho^2 - 5)\rho^4\sin4\theta +$$
$$Z_{29}(21\rho^4 - 30\rho^2 + 10)\rho^3\cos3\theta + Z_{30}(21\rho^4 - 30\rho^2 + 10)\rho^3\sin3\theta +$$
$$Z_{31}(56\rho^6 - 105\rho^4 + 60\rho^2 - 10)\rho^2\cos2\theta +$$
$$Z_{32}(56\rho^6 - 105\rho^4 + 60\rho^2 - 10)\rho^2\sin2\theta +$$
$$Z_{33}(126\rho^8 - 280\rho^6 + 210\rho^4 - 60\rho^2 + 5)\rho\cos\theta +$$
$$Z_{34}(126\rho^8 - 280\rho^6 + 210\rho^4 - 60\rho^2 + 5)\rho\sin\theta +$$
$$Z_{35}(252\rho^{10} - 630\rho^8 + 560\rho^6 - 210\rho^4 + 30\rho^2 - 1) +$$
$$Z_{36}(924\rho^{12} - 2772\rho^{10} + 3150\rho^8 - 1680\rho^6 + 420\rho^4 - 42\rho^2 + 1) + \ldots$$

where W represents the wavefront, $Z_n$ is known as a Zernike coefficient, i.e., the values with which the fit is performed, $\rho$ is the normalized radial coordinate and $\theta$ is the angular coordinate. This definition can be found in Wyant and Creath, "Basic Wavefront Aberration Theory for Optical Metrology", *Applied Optics and Engineering, Vol. XI*, p. 31, Boston, 1992. Since excellent algorithms to fit to this kind of function exist and are part of most commercial interferometry software packages, it is possible to examine the coefficients and arrive at a value for the conic constant directly.

Figure 2:
FIG. 2 is an illustration of the difference in wavefront between a spherical and an aspherical lens.

As shown in FIG. 2, a spherical wavefront 40 impinging on a conic surface 50 travels a different distance $\Delta z(r)$ in order to reflect from the surface across the conic surface 50 under test. This may be represented as:

$$\Delta z(r) = z_{sphere}(r) - z_{conic}(r) \quad (3)$$

Taking Equation (1) for the sphere (k=0) and conic (k≠0), and taking a series expansion of the resulting expression, $\Delta z(r)$ is given as:

$$\Delta z(r) = \frac{r^4}{8R_c^3}(-k) + \frac{3r^6}{48R_c^5}(1-(k+1)^2) + \ldots \quad (4)$$

The wavefront error due to the difference $\Delta z(r)$ is twice the value due to the distance traveled by the wavefront before and after the reflection at the surface, thus $$W = 2\left(\frac{r^4}{8R_c^3}(-k) + \frac{3r^6}{48R_c^5}(1-(k+1)^2) + \ldots\right) \quad (5)$$

The radial coordinate r in equation (4) and the normalized radial coordinate $\rho$ in equation (2) are related as follows:

$$\rho = \frac{2r}{\phi} \quad (6)$$

where $\phi$ is the diameter of the illuminated surface.

Using Equation (6) to substitute the normalized radial coordinate $\rho$ in Equation (4), equating the coefficients of $\rho^4$ in equations (2) and (4), and solving for the conic constant k:

$$k = \frac{-64R_c^3 W_{040}}{\phi^4} \quad (7)$$

where $W_{040}$ is given by:

$$W_{040} = 6Z_8 - 30Z_{15} + 90Z_{24} - 210Z_{35} + 420Z_{36} + \quad (8)$$

rather than the typical approximation, which only includes the first term.

This second method requires information about the diameter $\phi$ of the analysis aperture and the base sphere radius of curvature $R_c$. This is due to the large exponents on these values in Equation (8). The radius of curvature measurement can typically be accomplished with a great deal of precision using the interferometer and known techniques. The diameter measurement may be calibrated from the lateral dimension of the measured wavefront. This second approach also needs to calibrate the lateral dimensions of the interferogram. This may be complicated by the use of the variable numerical aperture (NA) objectives in current metrology systems. This calibration may be performed manually as part of a work instruction at the beginning of a testing session. This lateral calibration is the same as that performed in conjunction with the first method.

As an additional refinement for either method, a more accurate measure of the radius of curvature may be desirable to realize accurate results The magnitude of the "Focus" aberration is typically calculated using a low order approximation ($W_{020}=2Z_3-6Z_8$), which may be changed to a higher order approximation, e.g., ($W_{020}=2Z_3-6Z_8+12 Z_{15}-20 Z_{24}+30 Z_{35}-42Z_{36}$) to provide more accurate results. (Note $Z_n$ refers to the $n^{th}$ coefficient of the set of Zernike polynomials defined as by Wyant and Creath in *Applied Optics and Optical Engineering*, Vol. XII, pp. 28–36, 1992.) When an aspheric microlens is being analyzed, insuring that the measurement is at the correct confocal position is more important than when analyzing a spherical microlens. Using more terms aids in insuring this.

For either method, the determined parameters, whether measured and fit or numerically modeled, are compared to desired parameters to determine whether the microlens is satisfactory. If it is not satisfactory, the microlens is rejected. Some alteration to the manufacturing process may be warranted if too many microlenses fail. Both of these methods are particularly useful for analyzing microlenses, e.g., lenses having a diameter of 1 mm or less. This is due to the requirement that the fringes in the image from the interferometer be resolvable. The larger the magnitude of the conic constant, the smaller the lens diameter needs to be for this condition to be realized.

The above analysis is also particularly useful to determine an optimal process for manufacturing a desired aspheric microlens as illustrated in the flow chart of FIG. 3. In step 60, an initial process is used to create an aspheric microlens. The conic constant of the resulting microlens is then determined using one of the above methods in step 62. The determined conic constant is then compared with a desired conic constant in step 64. If the determined conic constant is within a satisfactory range of the desired conic constant, then the process has been sufficiently optimized and this modification loop is concluded. If not, the process is altered in step 66, another microlens is created at step 68, and the conic constant of this microlens is compared to the desired conic constant again in step 64. If the determined conic constant is closer to the desired conic constant, but still not within the satisfactory range, further alterations may be taken. If the determined conic constant resulting from this altered process is further from the desired conic constant, process parameters may be adjusted in a different direction than the first alteration. This alteration is reiterated until the conic constant is within a satisfactory range of the desired conic constant, i.e., an optimal process has been realized. While the above has assumed a single microlens has been created by the process, in practice, multiple microlenses may be created on a wafer. The conic constant of any desired proportion of the microlenses may be determined, as there may be variations in microlenses created at different portions of the wafer. The acceptability of the microlenses over the entire wafer may be appraised.

Although preferred embodiments of the present invention have been described in detail herein above, it should be clearly understood that many variations and/or modifications of the basic inventive concepts taught herein, which may appear to those skilled in the art, will still fall within the spirit and scope of the present invention as defined in the appended claims and their equivalents.

What is claimed is:

1. A method of evaluating an aspherical microlens comprising:

aligning the aspherical microlens in an interferometer;

projecting a spherical wavefront on the aspherical microlens;

detecting a wavefront reflected from the aspherical microlens; and deriving from the wavefront a conic constant that specifies the asphericity of the aspherical microlens.

2. The method according to claim 1, further comprising comparing the conic constant from the wavefront to a desired conic constant.

3. The method according to claim 1, wherein said deriving includes fitting an equation representing an aspheric lens to the wavefront.

4. The method according to claim 3, wherein the equation is given by:

$$z(r) = \frac{R_c r^2}{1 + \sqrt{1 - (1+k)R_c^2 r^2}}$$

where $R_c$ is the base sphere radius of curvature, r is the radial coordinate, z(r) is the surface height at r, and k is the conic constant.

5. The method according to claim 4, wherein said deriving further includes determining the radial coordinate r by calibrating a lateral dimension of the wavefront.

6. The method according to claim 1, wherein said deriving includes expressing the wavefront numerically as a set of polynomials.

7. The method according to claim 6, wherein the set of polynomials constitute Zernike polynomials.

8. The method according to claim 7, wherein the conic constant derived from Zernike polynomials is directly proportional to the cube of the base sphere radius of curvature and is inversely proportional to the fourth power of the diameter of the analysis aperture.

9. The method according to claim 7, further comprising determining the diameter of the analysis aperture by calibrating a lateral dimension of the wavefront.

10. The method according to claim 1, further comprising establishing a correct confocal position for the aspherical microlens.

11. The method according to claim 1, further comprising calibrating a lateral dimension of the wavefront.

12. The method according to claim 11, wherein said calibrating includes providing controlled radial structures to thereby map positions in the wavefront to lateral coordinates on an object under test.

13. The method according to claim 2, further comprising altering manufacturing of the aspherical microlens in accordance with a difference between the conic constant and the desired conic constant.

14. The method according to claim 13, further comprising reiterating said altering until the conic constant is within a satisfactory range of the desired conic constant.

* * * * *